(12) United States Patent
Kodaira

(10) Patent No.: US 9,684,160 B2
(45) Date of Patent: *Jun. 20, 2017

(54) ELECTROWETTING DISPLAY DEVICE AND MANUFACTURING METHOD THEREOF

(71) Applicant: Amazon Technologies, Inc., Seattle, WA (US)

(72) Inventor: Taimei Kodaira, Hwaseong-si (KR)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/584,769

(22) Filed: Dec. 29, 2014

(65) Prior Publication Data

US 2015/0109656 A1    Apr. 23, 2015

Related U.S. Application Data

(63) Continuation of application No. 13/962,467, filed on Aug. 8, 2013, now Pat. No. 8,922,869.

(30) Foreign Application Priority Data

Aug. 8, 2012 (KR) .................... 10-2012-0086949

(51) Int. Cl.
*G02B 26/00* (2006.01)
*G02F 1/03* (2006.01)
(Continued)

(52) U.S. Cl.
CPC .............. *G02B 26/005* (2013.01); *G02B 1/12* (2013.01); *G02B 26/00* (2013.01)

(58) Field of Classification Search
CPC ... G02F 1/133; G02F 1/29; G02F 1/01; G02F 1/03; G02F 1/15; G02F 1/155;
(Continued)

(56) References Cited

U.S. PATENT DOCUMENTS 5,218,301 A * 6/1993 Kuckes ..................... 324/346
6,338,901 B1 * 1/2002 Veerasamy .................. 428/408
(Continued)

OTHER PUBLICATIONS

Office Action for U.S. Appl. No. 13/962,467, mailed on May 22, 2014, Taimei Kodaira, "Electrowetting Display Device and Manufacturing Method Thereof", 8 pages.

*Primary Examiner* — Dawayne A Pinkney
(74) *Attorney, Agent, or Firm* — Lee & Hayes, PLLC

(57) ABSTRACT

The present disclosure relates to an electrowetting display device and a manufacturing method for the same, using a UV light reactive fluorosurfactant layer. The UV light reactive fluorosurfactant layer can include a UV-cured fluorine based material positioned above a cured UV reactive material. In an embodiment, the electrowetting display device can also include a substrate with a layer of pixel electrodes formed over the substrate, and partition walls formed over at least a portion of the layer of pixel electrodes. In one embodiment, the UV light reactive fluorosurfactant layer can be formed between the partition walls and above an inter-layer insulation film. In another embodiment, the UV light reactive fluorosurfactant layer can be formed between the partition walls and above the layer of pixel electrodes. The electrowetting display can also include a water repellent layer formed over the UV light reactive fluorosurfactant layer.

19 Claims, 4 Drawing Sheets

(51) Int. Cl.
*G02B 1/06* (2006.01)
*G02F 1/133* (2006.01)
*G02B 1/12* (2006.01)

(58) Field of Classification Search
CPC ........... G02F 1/153; G02B 5/23; G02B 26/00; G02B 26/08; G02B 1/06
USPC ........ 359/290–293, 295, 315–316, 276, 238, 359/245, 242, 259, 244, 253–254, 359/265–275, 665–667, 223–225, 243, 359/260–263
See application file for complete search history.

(56) References Cited

U.S. PATENT DOCUMENTS

| | | | |
|---|---|---|---|
| 2003/0207500 A1* | 11/2003 | Pichler et al. | 438/127 |
| 2013/0182309 A1* | 7/2013 | Kim | G02B 26/005 359/290 |
| 2013/0208337 A1 | 8/2013 | Lee et al. | |
| 2013/0222880 A1 | 8/2013 | Nakasuga et al. | |
| 2013/0271816 A1* | 10/2013 | Shim | G02B 26/005 359/290 |
| 2014/0043671 A1 | 2/2014 | Kodaira | |
| 2015/0277102 A1* | 10/2015 | Park | G02B 26/005 359/290 |

* cited by examiner

ELECTROWETTING DISPLAY DEVICE AND MANUFACTURING METHOD THEREOF

CROSS REFERENCE TO RELATED PATENT APPLICATIONS

The present application is a continuation of and claims priority to U.S. patent application Ser. No. 13/962,467, entitled "Electrowetting Display Device and Manufacturing Method Thereof", filed Aug. 8, 2013, now U.S. Pat. No. 8,922,869, issued Dec. 30 2014, which claims the benefit of, and priority to Republic of Korea Patent Application No. 10-2012-0086949, entitled "Electrowetting Display Device and Manufacturing Method Thereof", filed Aug. 8, 2012, which are incorporated herein by reference in their entirety.

FIELD OF THE INVENTION

The present disclosure relates to an electrowetting display device and a manufacturing method for the same. More particularly, the present disclosure relates to an electrowetting display device and a method for manufacturing the electrowetting display device without having to apply hydrophilic treatment and hydrophobic treatment separately.

BACKGROUND

Flat panel display devices can include liquid crystal displays (LCD), plasma display panels (PDP), organic light emitting displays (OLED), field effect displays (FED), electrophoretic displays (EPD), and electrowetting displays (EWD).

Among these types of displays, the electrowetting display device expresses gradation in pixels by controlling movement of oil in water, with water being an electrolyte. Since the electrowetting display device is a shutter type display device that does not use a polarizing plate, an EWD has high light transmittance with gamma characteristics (measured by voltage) that are linear. In addition, the electrowetting display devices can be formed as a reflective type display or transmission type display according to the environment of application. A reflective type of electrowetting display device may omit back light.

While electrowetting display devices are manufactured using the same processes as those used to manufacture other flat panel display devices, such as LCDs, for example, an additional filling process is required to fill water and oil over the device. For proper operation of an electrowetting display device, the layer below the oil must be a water repellent layer having a hydrophobic property. It is difficult to form a hydrophilic layer, like a partition layer, over the water repellent layer. To form a partitioning wall, the water repellent layer must be applied with a reactive ion etching (RIE) treatment to provide hydrophilicity. After forming the partition walls, oil is provided, and then a thermal reflow process is applied so that the water repellent layer resumes hydrophobicity to operate the electrowetting display device.

As described above, a plurality of processes have to be conducted alternately to provide hydrophilicity and hydrophobicity, which results in a complicated process, increased time and increased cost. Further, the water repellent layer after thermal reflow process may fail to acquire sufficient hydrophobicity which can lead to poor oil filling and deteriorated performance of the electrowetting display devices.

SUMMARY

An electrowetting display device formed in accordance with an embodiment of the present disclosure comprises a substrate with pixel electrodes formed over the substrate, and partition walls formed over the pixel electrodes. An inter-layer insulation film can also be formed over the pixel electrodes. In addition, the electrowetting display device can also include a phase-separated, UV light reactive fluorosurfactant layer formed between the partition walls and above the inter-layer insulation film. In an embodiment, the electrowetting display device can include a water repellent layer formed over the UV light reactive fluorosurfactant layer.

In an embodiment, the UV light reactive fluorosurfactant comprises one or more of: a UV light reactive material layer (cured with light), and/or a fluorine based material. In embodiments of the present disclosure, the fluorine based material can be positioned above the cured UV light reactive material layer after exposing the UV light reactive fluorosurfactant to UV.

In an embodiment, the UV light reactive fluorosurfactant can include an oligomer with one or more of: a fluoro group, a hydrophilic group, a lipophilic group, or a UV reactive group, such as Megaface RS-72-K of DIC Corporation of Tokyo, Japan.

In an embodiment, the UV light reactive fluorosurfactant can comprise compounds containing one or more of a perfluoro alkyl group or UV light reactive materials. The UV light reactive materials can include acrylic materials. For example, the UV light reactive materials can include an acrylate.

In an embodiment, a black oil layer can be formed between the partition walls and over the lyophobic water-repellent layer.

In an embodiment, the inter-layer insulation film can be formed over the pixel electrodes and under the UV light reactive fluorosurfactant layer and the partition walls.

The manufacturing method for the electrowetting display devices in accordance with an embodiment of the present disclosure comprises forming pixel electrodes on a substrate, and coating a UV light reactive fluorosurfactant over the pixel electrodes. In addition the method for manufacturing the electrowetting display devices in accordance with an embodiment of the present disclosure comprises forming a UV light reactive fluorosurfactant layer by exposing at least portions of the coated UV light reactive fluorosurfactant and removing unexposed portions of the UV light reactive fluorosurfactant. Further, the method for manufacturing the electrowetting display devices in accordance with an embodiment includes forming partition walls in the area where the UV light reactive fluorosurfactant has been removed, and forming a water repellent layer over the cured UV light reactive fluorosurfactant layer.

In an embodiment, the UV light reactive fluorosurfactant can comprise one or more of: a UV light reactive material layer (cured with light), and/or fluorine based materials.

In an embodiment, the UV light reactive fluorosurfactant is phase separated when exposing the coated UV light reactive fluorosurfactant, which leaves the fluorine based material positioned substantially above the cured UV light reactive material.

In an embodiment, the UV light reactive fluorosurfactant can include an oligomer with one or more of: a fluoro group, a hydrophilic group, a lipophilic group, or a UV reactive group, such as Megaface RS-72-K of DIC Corporation of Tokyo, Japan.

In an embodiment, the UV light reactive fluorosurfactant can comprise compounds containing one or more of a perfluoro alkyl group or UV light reactive materials. The UV light reactive materials can include acrylic materials. For example, the UV light reactive materials can include an acrylate.

In an embodiment, the unexposed portions of the UV light reactive fluorosurfactant can be removed by etching with a developing solution.

In an embodiment, after forming the water repellent layer, a black oil layer can be formed between the partition walls and over the lyophobic water repellent layer.

In an embodiment, an inter-layer insulation film can be formed over the pixel electrodes between the forming of the pixel electrodes and coating the UV light reactive fluorosurfactant.

In an embodiment, an electrowetting display device can include a substrate and a layer of pixel electrodes formed on the substrate. The electrowetting display device can also include partition walls formed over a first portion of the layer of pixel electrodes and a phase separated UV light reactive fluorosurfactant layer formed between the partition walls and over a second portion of the layer of pixel electrodes. Further, the electrowetting display device can include a water repellent layer formed over the UV light reactive fluorosurfactant layer.

In an embodiment, the pixel electrodes can include one or more of indium tin oxide or indium zinc oxide.

In an embodiment, the UV light reactive fluorosurfactant layer can include one or more of a perfluoro alkyl group or one or more materials having photoactive groups.

In an embodiment, the perfluoro alkyl group can include a hydrocarbon having at least a portion of the hydrogen atoms substituted by fluorine atoms.

In an embodiment, the electrowetting display device can include a protective film, where the layer of pixel electrodes is formed over the protective film, and the protective film is formed with a contact hole to connect a pixel electrode to a drain electrode.

In an embodiment, the electrowetting display device can include a thin film transistor that includes a drain electrode connected to a pixel electrode.

Fabricating the electrowetting display device in accordance with the present disclosure without having to apply a hydrophobic treatment and subsequently apply a hydrophilic treatment can lead to reduced processes, reduced process time and reduced cost.

In addition, a hydrophobic treatment and a hydrophilic treatment may not both be applied to a layer of the electrowetting display device, which can prevent deterioration of the hydrophobicity of the layer, prevent oil filling failure, and prevent operation failure of the electrowetting display device.

DETAILED DESCRIPTION

Figure 1:
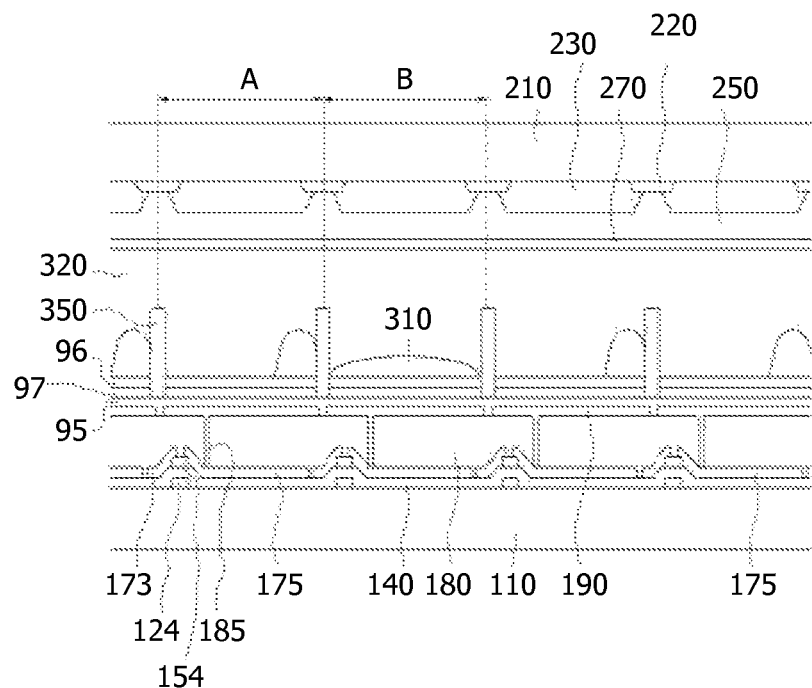
FIG. 1 is a cross-sectional view of the electrowetting display device in accordance with an embodiment of the present disclosure.

The technical characteristics and other advantages of the present disclosure may be found in the following description of embodiments herein, made by way of non-limiting examples and with reference to the accompanying drawings, so that those skilled in the pertinent art will be able to devise an embodiment in accordance with the present disclosure. However, the present disclosure can be implemented in various different ways and not limited to the embodiments set forth and described herein.

In the drawings, the figures are drawn with enlarged thicknesses in order to express the layers and area more clearly. Throughout the Description, similar parts and components are depicted with the same numbers. When a layer, film, area or sheet member is said to be "over" another member, such configuration also includes the configurations where other members can exist between the two members. On the other hand, an expression "right on something" means that there are no other members between the two.

The electrowetting display device in accordance with an embodiment of the present disclosure is described in detail by referring to the accompanying drawings.

An electrowetting display device in accordance with an embodiment of the present disclosure is described herein below by referring to FIG. 1.

FIG. 1 is a cross-sectional view of an electrowetting display device in accordance with an embodiment of the present disclosure.

As shown in FIG. 1, the electrowetting display device in accordance with an embodiment of the present disclosure, can include a transmissive electrowetting display device, that comprises a lower substrate 110 formed with pixel electrodes 190, and an upper substrate 210 opposing the lower substrate 110. The electrowetting display device can be formed with common electrodes 270, and electro-optic layers 310 and 320 interposed between the lower substrate 110 and the upper substrate 210. On the lower substrate 110 are formed partition walls 350 that are further formed with a plurality of openings (spaces between the partition walls 350), and the electro-optic layers 310 and 320. The electro-optic layer 310 can comprise a black oil layer 310 placed inside the opening between the partition walls 350. The electro-optic layer 320 can include an aqueous solution layer 320 positioned between the black oil layer 310 and the common electrodes 270.

The lower substrate 110 and the upper substrate 210 can be a glass substrate, or a flexible substrate made of plastic or glass fiber reinforced plastic (FRP).

On the lower substrate 110 are formed a plurality of gate electrodes 124 connected to a plurality of gate lines extending in one direction. A gate insulation film 140 made of silicon nitride (SiNx), etc. is formed over the gate lines and the gate electrodes 124.

A semiconductor layer 154, made of hydrogenated amorphous silicon, etc. is formed over the gate insulation film 140. The semiconductor layer 154 forms channels of thin film transistors. Data lines and drain electrodes 175 are formed over the gate insulation film 140 and the semiconductor layer 154. The data lines extend in a direction perpendicular to and cross with the gate lines. In addition branch lines from each data line form source electrodes 173. At least a portion of a pair of the source electrode 173 and the drain electrode 175 overlaps on the semiconductor layer 154 and are separated from each other, and positioned opposite to the gate electrode 124.

A resistive contact member can be further formed between the semiconductor layer 154, the source electrode 173 and the drain electrode 175. The resistive contact member can reduce the contact resistance among these members.

Over the source electrodes 174, the drain electrodes 175, the semiconductor layer 154 and the gate insulation layer 140, a protective film 180 made of an insulation material or an organic material such as silicon oxide or silicon nitride is formed.

On the protective layer 180 are formed the pixel electrodes 190, which are made of transparent conductive materials, such as ITO (Indium Tin Oxide) or IZO (Indium Zinc Oxide).

The protective film 180 is formed with contact holes 185 to expose the drain electrodes 175. The pixel electrode 190 is connected to the drain electrode 175 physically and electrically via the contact hole 185.

An inter-layer insulation film 95 is formed over the pixel electrodes 190. The inter-layer insulation film 95 is made of inorganic insulation material such as silicon nitride (SiNx) or an organic insulation film. The inter-layer insulation film 95 can be formed between the adjacent pixel electrodes 190.

The partition walls 350 are formed over the inter-layer insulation film 95. The partition walls 350 are formed in a matrix shape having openings and define the pixel areas. The partition walls 350 can be formed of an organic film containing black pigment.

Between the openings of the partition walls 350 and over the inter-layer insulation film 95, a fluorine based material is placed to provide hydrophobicity. The fluorine based material can form a lyophobic, phase separated UV light reactive fluorosurfactant layer 97. The UV light reactive fluorosurfactant layer 97 comprises photoactive materials reactive to ultraviolet (UV) or light and fluorine based materials. In the UV light reactive fluorosurfactant layer 97, the fluorine based materials are placed substantially above the photoactive materials when exposed to UV or light, resulting in phase separation.

Many materials can be used as the UV light reactive fluorosurfactant layer 97, for example, an oligomer with one or more of: a fluoro group, a hydrophilic group, a lipophilic group, or a UV reactive group, such as Megaface RS-72-K™ of DIC Corporation of Tokyo, Japan. Here, Megaface is the brand name and the RS-72-K is the grade.

Other materials that can be used as the UV light reactive fluorosurfactant layer 97 can be compounds comprising a perfluoro alkyl group and photoactive substances, or the materials comprising a perfluoro alkyl group and one or more materials having photoactive groups. In an embodiment, the photoactive groups can include an acrylate.

The perfluoro alkyl group can include a hydrocarbon group of which all or a portion of the hydrogen atoms are substituted by fluorine atoms.

Figure 7:
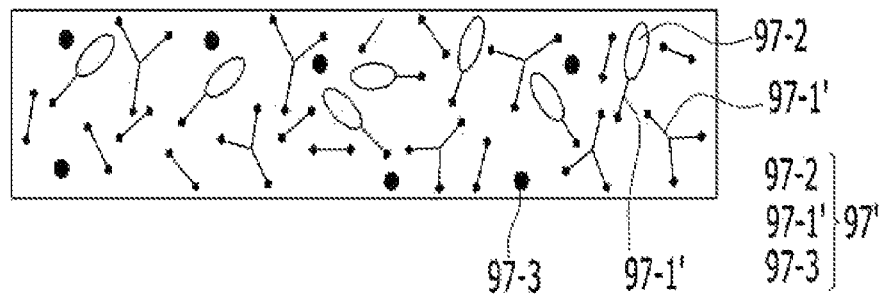
FIG. 7 shows the structure of the UV light reactive fluorosurfactant used in an embodiment of the present disclosure.
Figure 8:
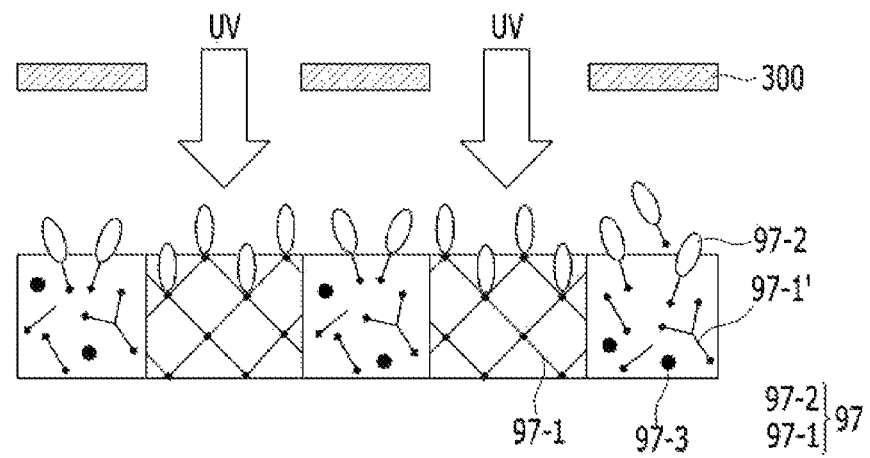
FIG. 8 shows the change of the characteristics of the UV light reactive fluorosurfactant used in an embodiment of the present disclosure when exposed to UV light.

The UV light reactive fluorosurfactant layer 97 is described in further detail by referring to FIG. 7 and FIG. 8.

A water repellent layer 96 is formed between the openings of the partition walls 350 and over the UV light reactive fluorosurfactant layer 97. The water repellent layer 96 is formed of a hydrophobic, insulation material, e.g. AF1600 of E.I. du Pont de Nemours and Company of Wilmington, Del.

A black oil layer 310 is formed over the water repellent layer 96.

A black matrix 220 having a plurality of openings is formed beneath the upper substrate 210 and color filters 230 which are formed in the openings of the matrix 220. The color filters 230 can be formed of pigments allowing transmission of a specific wavelength band or a quantum dot, semiconductor nanocrystal material. The quantum dot material is a semiconductor nanocrystal, comprising from hundreds to thousands of atoms. The semiconductor nanocrystals may have large specific surface areas due to their small sizes and provide a quantum confinement effect. Consequently, the semiconductor nanocrystals show physical and chemical characteristics different from those of typical semiconductor materials.

To implement a color display, each pixel displays one of the primary colors (spatial division) or each pixel displays primary colors alternatively along time (time division). The desired color tone can be achieved with a spatial or temporal sum of the primary colors. The primary colors can be the three primary colors of red, green and blue.

A flattening layer 250 is formed beneath the color filter 230 and the black matrix 220 and a common electrode 270 is formed beneath the flattening layer 250.

In addition, an aqueous solution layer 320 is formed between the partition walls 350, black oil layer 310 and common electrode 270. The aqueous solution layer 320 is not mixed with the black oil layer 310.

Since the surface tension of the aqueous solution layer 320 does not change in the pixel B where no electric field is applied between the pixel electrode 190 and the common electrode 270, the black oil layer 310 covers substantially all of the pixel B. As such, the light entering from the lower side cannot pass through the black oil layer 310, and the pixel B exhibits black.

On the contrary, in the pixel A where an electric field is applied between the pixel electrode 190 and the common electrode 270, the surface tension of the aqueous solution 320 changes and opens the pixel A by compressing the black oil layer 310. As such, the light entering from the lower side passes through the aqueous solution 320, and the pixel A exhibits a color defined by the color filter 230.

If necessary, the color filter 230 may be omitted. If the flat panel display device in accordance with the present disclosure does not include a color filter 230, the pixel exhibits white, and thus, can be used as a black-white display device.

Figure 2:
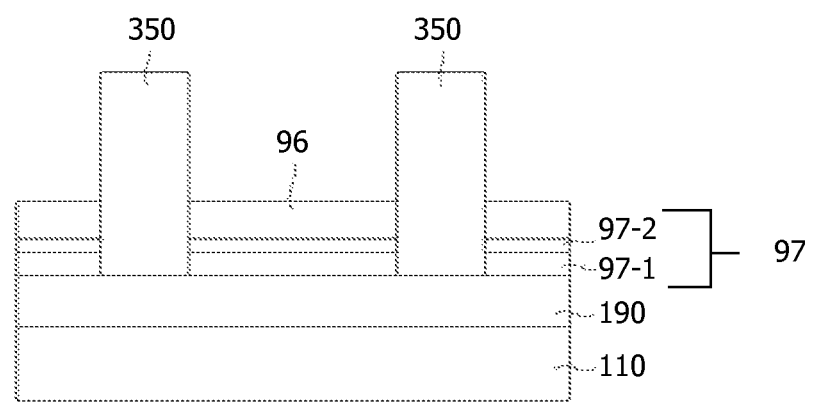
FIG. 2 is an enlarged, cross-sectional view of the electrowetting display device in accordance with an embodiment of the present disclosure.

To describe the UV light reactive fluorosurfactant layer 97 in further detail, FIG. 2 shows an enlarged cross-sectional view of the electrowetting display device in accordance with an embodiment of the present disclosure.

FIG. 2 is an enlarged, cross-sectional view of the electrowetting display device in accordance with an embodiment of the present disclosure, focusing on the lower substrate 110.

In FIG. 2, the thin film transistor (gate electrode 124, source electrode 173, drain electrode 175 and semiconductor layer 154) formed on the lower substrate 110 is omitted for clarity of explanation, and the focus of the view is on the structure over the pixel electrode 190. In addition, the embodiment in FIG. 2 shows a structure wherein the inter-layer insulation film 95 is not formed on the pixel electrode 190. The inter-layer insulation film 95 may be and may not be included in the structure according to the embodiment.

In the illustrative embodiment of FIG. 2, pixel electrodes 190 are formed on the lower substrate 110. While FIG. 2 shows that the pixel electrodes 190 are formed as an integral body, each of the pixel electrodes can be electrically isolated. Since FIG. 2 is a brief diagram of the layer formed with the pixel electrodes 190, the boundaries between the pixel electrodes 190 are not shown.

Partition walls 350 are formed over the pixel electrodes 190. Since the pixel electrodes 190 are not lyophobic (or hydrophobic), there is no problem in forming the partition walls 350 above the pixel electrodes 190. In addition, in the embodiments where the inter-layer insulation film 95 is formed over the pixel electrodes 190, the partition walls 350 can be formed because the inter-layer insulation film 95 is not lyophobic (or hydrophobic).

In the illustrative embodiment of FIG. 2, over the openings of the partition walls 350 and the pixel electrodes 190, the UV light reactive fluorosurfactant layer 97 is formed. In other embodiments that include the inter-layer insulation film 95, the UV light reactive fluorosurfactant layer 97 is formed over the inter-layer insulation film 95. The UV light reactive fluorosurfactant layer 97 is phase separated, as shown in FIG. 2. That is, the UV light reactive fluorosurfactant layer 97 includes the lyophobic, fluorine based material 97-2 in an upper position and the photoactive material 97-1 cured with UV or light is positioned below the fluorine-based material 97-2.

FIGS. 3 to 6 are sequential cross-sectional views of the processes of manufacturing the electrowetting display device in accordance with an embodiment of the present disclosure.

FIGS. 3 to 6 are the cross-sectional views of the electrowetting display device representing the manufacturing processes in accordance with an embodiment of the present disclosure.

FIG. 3 to FIG. 6 show the layers formed on the lower substrate 110 of the embodiment shown in FIG. 2 sequentially.

Figure 3:
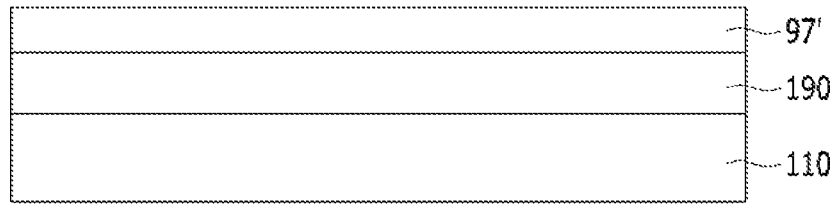
FIGS. 3 to 6 are the cross-sectional views of the electrowetting display device representing the manufacturing processes in accordance with an embodiment of the present disclosure.

First, in FIG. 3, the pixel electrodes 190 are formed on the lower substrate 110. In FIG. 3, to depict the position of the pixel electrode 190 simply as was the case of FIG. 2, the pixel electrode 190 is depicted as an integral body, however, a respective pixel electrode 190 can be formed for each pixel and the pixel electrodes 190 can be electrically isolated. Then, according to the embodiment, the inter-layer insulation film 95 can be formed on the pixel electrode 190. The inter-layer insulation film 95 can be formed with an inorganic insulation material such as silicon nitride (SiNx) or an organic insulation material. In an embodiment, the inter-layer insulation film 95 can be formed in spaces found between the adjacent pixel electrodes 190.

Next, over the pixel electrodes 190, the UV light reactive fluorosurfactant layer 97' is formed. In embodiments including the inter-layer insulation film 95, the UV light reactive fluorosurfactant layer 97' is formed over the inter-layer insulation film 95. The UV light reactive fluorosurfactant 97' can include various materials. In the embodiment of FIG. 7, for example, the UV light reactive fluorosurfactant 97' comprises a Fluoro-Group: 97-2, a UV Reactive Group: 97-1' and a Photoinitiator: 97-3

In the embodiment of FIG. 7, the UV Reactive Group: 97-1' and the Photoinitiator: 97-3 react to UV. The UV reactive material 97-1' can be a combination of a plurality of UV reactive groups 97-1' as shown in FIG. 7, or comprise one UV reactive group 97-1' independently, or associated with the fluoro-groups 97-2.

Many materials can be used as the UV light reactive fluorosurfactant 97'. For example, the UV light reactive fluorosurfactant 97' can include Megaface RS-72-K™ of DIC Corporation of Tokyo, Japan. Here, Megaface is the brand name and the RS-72-K is the grade.

Other materials that can be used as the UV light reactive fluorosurfactant 97' can include a compound comprising a perfluoro alkyl group and photoactive substances, or a material comprising a perfluoro alkyl group and material having photoactive groups. In an embodiment, the photoactive substances and/or the photoactive groups can include an acrylate.

Here, the perfluoro alkyl group can be a hydrocarbon group of which all or a portion of the hydrogen atoms are substituted by fluorine atoms.

Figure 4:
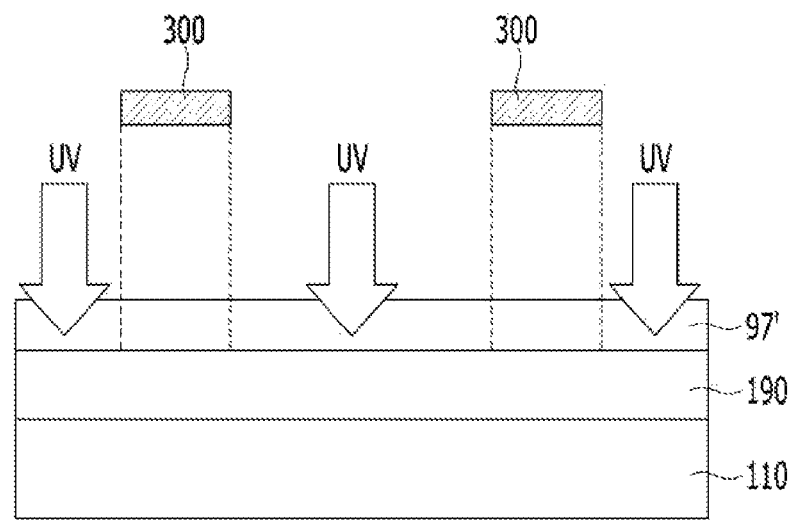

Next, as shown in FIG. 4, the areas exposed from mask 300 are exposed to UV or light. When the UV light reactive fluorosurfactant 97' is exposed to UV or light, the UV reactive groups 97-1' are bound together and cured by the UV or light, forming the cured material layer 97-1 in the lower portion, while leaving the fluoro-groups 97-2 in the upper portion. As a result, a UV light reactive fluorosurfactant layer 97 is formed. When the UV light reactive fluorosurfactant 97' is not exposed to UV or light, the UV reactive groups 97-1' are not cured and are removed using a developing solution, or a similar type of solution.

FIG. 8 shows the process more clearly. When the UV light reactive fluorosurfactant 97' is coated, the coating layer includes fluoro groups 97-2, UV reactive groups 97-1' and photoinitiator 97-3 in a random arrangement. However, the fluoro-groups (97-2) may be automatically positioned on the surface of the UV light reactive fluorosurfactant 97' due to their intrinsic characteristics. The fluoro-groups (97-2) can be positioned at the surface in the uncured phase and can be removed with a developing solution.

When the UV light reactive fluorosurfactant 97' is exposed to UV or light, the UV reactive groups 97-1' and the photoinitiator 97-3 react in response to the UV or light, forming light cured materials 97-1 arranged in the lower position, and leaving fluoro-groups 97-2 in the upper position. The fluoro-groups 97-2, being associated with UV reactive groups 97-1', are moved to the upper position and cured when the UV reactive groups 97-1' react with light. As a result, the UV light reactive fluorosurfactant layer 97 is phase separated into the fluoro-groups 97-2 in the upper position and the cured light-reacted groups 97-1 in the lower position.

Figure 5:
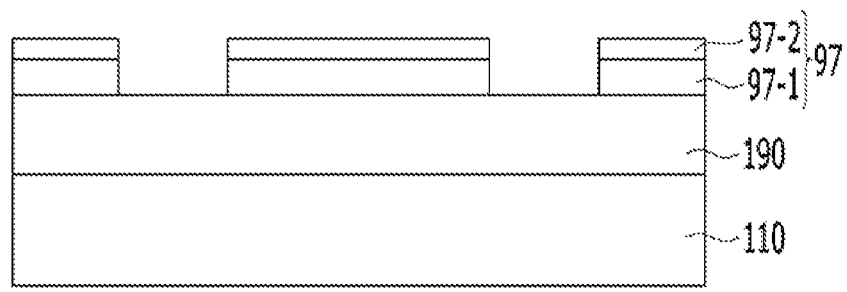

As shown in FIG. 4, the UV light reactive fluorosurfactant 97' is exposed using a mask, and the portions of the UV light reactive fluorosurfactant 97' that are not exposed are removed using a developing solution to obtain the UV light reactive fluorosurfactant layer 97. The UV light reactive fluorosurfactant layer 97 so formed is shown in FIG. 5.

Figure 6:
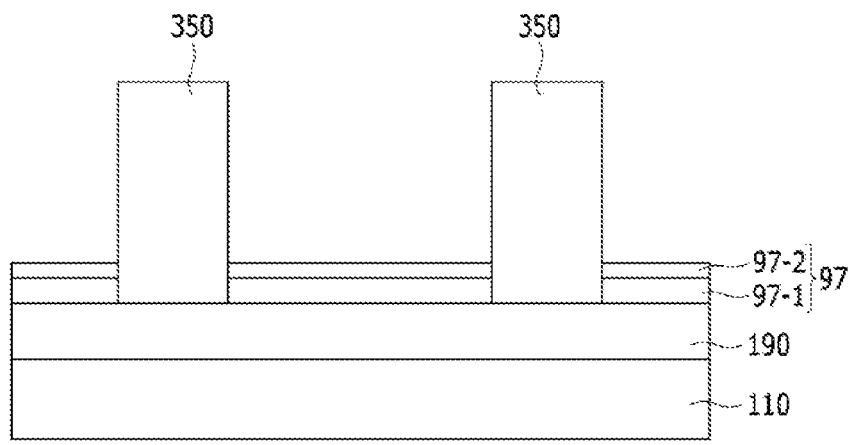

Next, as shown in FIG. 6, in the areas where the UV light reactive fluorosurfactant 97' is unexposed and removed, the partition walls 350 are formed. The partition walls 350 are formed over the pixel electrodes 190. In embodiments, that include an inter-layer insulation film 95, such as in the embodiment of FIG. 1, the partition walls 350 are formed over the inter-layer insulation film 95. The partition walls 350 are formed in a black matrix shape having openings and define the pixel areas so that the black oil layer 310 can move within pixel areas. In addition, the partition walls 350 can be formed with an organic film containing black pigment.

Then, as shown in FIG. 2, a water repellent layer 96 is formed between the openings of the partition walls 350 and over the UV light reactive fluorosurfactant layer 97. Then, a black oil layer 310 is formed over the lyophobic water repellent layer 96.

As described above, performing phase separation using a UV light reactive fluorosurfactant and light exposure, can form a UV light reactive fluorosurfactant layer with a developing solution. The UV light reactive fluorosurfactant layer can include an upper portion that has hydrophobicity to achieve sufficient adhesion with a water repellent layer and lower and/or side portions that have hydrophilicity to achieve easy adhesion with partition walls.

In an embodiment, the UV light reactive fluorosurfactant layer can act as a water repellent layer. In these cases, a separate water repellent layer, such as the water repellent layer 96, may be absent from the electrowetting display device. For example, the UV light reactive fluorosurfactant layer can include an upper portion, and one or more of a lower portion or a side portion, where the upper portion can include a hydrophobicity to form the water repellent layer. In other embodiments, the fluorosurfactant layer can act as at least a portion of a water repellent layer.

In addition, the electrowetting display device can be implemented in a reflective type by forming the pixel electrodes 190 with a light reflective metal or further forming a metal layer (called a reflective electrode) over the pixel electrode 190.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electrowetting display device, comprising:
    a substrate;
    a layer of pixel electrodes disposed on the substrate;
    partition walls;
    fluorosurfactant disposed between the partition walls and on the layer of pixel electrodes, the fluorosurfactant including:
        a first hydrophobic layer comprising a first material; and
        a hydrophilic layer, wherein at least a portion of the hydrophilic layer is beneath the first hydrophobic layer, and wherein the fluorosurfactant comprises fluorine based materials and photoactive materials; and
    a second hydrophobic layer on the first hydrophobic layer, wherein the second hydrophobic layer comprises a non-fluid material different from the first material.

2. The electrowetting display device of claim 1, wherein the fluorosurfactant further comprises a UV light reactive material layer and the photoactive materials are included within the UV light reactive material layer.

3. The electrowetting display device of claim 1, wherein the fluorosurfactant further includes an oligomer that comprises at least one of (i) a fluoro group, (ii) a hydrophilic group, (iii) a lipophilic group, and (iv) a UV reactive group.

4. The electrowetting display device of claim 1, wherein the fluorosurfactant further comprises compounds comprising at least one of (i) a perfluoro alkyl group and (ii) a UV reactive acrylic material.

5. The electrowetting display device of claim 1, further comprising:
    an oil layer disposed between the partition walls and on the second hydrophobic layer.

6. The electrowetting display device of claim 1, further comprising an inter-layer insulation film disposed on the layer of pixel electrodes and under the fluorosurfactant.

7. The electrowetting display of claim 6, wherein the partition walls are disposed on the inter-layer insulation film.

8. The electrowetting display of claim 1, wherein the partition walls are disposed on the layer of pixel electrodes.

9. The electrowetting display device of claim 1, wherein:
    the partition walls are disposed on the layer of pixel electrodes and the photoactive materials are adhered along sides of the partition walls.

10. A method of manufacturing an electrowetting display device, the method comprising:
    providing pixel electrodes on a substrate;
    exposing first portions of a ultra violet (UV) light reactive fluorosurfactant layer on the pixel electrodes to UV light to provide a fluorosurfactant layer on the pixel electrodes, wherein a first portion of the UV light reactive fluorosurfactant layer is hydrophobic and a second portion of the UV light reactive fluorosurfactant layer is hydrophilic;
    removing unexposed second portions of the UV light reactive fluorosurfactant layer by etching the unexposed second portions of the UV light reactive fluorosurfactant layer with a developing solution; and
    forming partition walls in areas where the second portions of UV light reactive fluorosurfactant have been removed, wherein the areas are hydrophilic.

11. The method of claim 10, wherein the first portion of the UV light reactive fluorosurfactant layer acts as at least a portion of a water repellent layer.

12. The method of claim 10, wherein the UV light reactive fluorosurfactant layer comprises at least one of (i) a UV light reactive material and (ii) fluorine based materials.

13. The method of claim 12, wherein exposing first portions of the UV light reactive fluorosurfactant layer comprises phase separating the UV light reactive fluorosurfactant layer when the UV light reactive fluorosurfactant layer is exposed to the UV light such that the fluorine based materials are positioned substantially above a cured layer of the UV light reactive material.

14. The method of claim 12, wherein the UV light reactive fluorosurfactant includes an oligomer comprising at least one of (i) a fluoro group, (ii) a hydrophilic group, (iii) a lipophilic group, and (iv) a UV reactive group.

15. The method of claim 10, wherein the UV light reactive fluorosurfactant layer comprises compounds containing at least one of (i) a perfluoro alkyl group and (ii) a UV reactive acrylic material.

16. The method of claim 10, further comprising providing an oil layer between the partition walls.

17. The method of claim 10, further comprising providing an inter-layer insulation film on the pixel electrodes after providing the pixel electrodes and before exposing first portions of the UV light reactive fluorosurfactant layer.

18. The method of claim 10, further comprising placing a hydrophobic layer on the first portion of the UV light reactive fluorosurfactant layer, wherein the hydrophobic layer comprises a non-fluid material different from the UV light reactive fluorosurfactant layer.

19. A method of manufacturing an electrowetting display device, the method comprising:
    providing pixel electrodes on a substrate;
    exposing first portions of an ultra violet (UV) light reactive fluorosurfactant layer on the pixel electrodes to UV light to provide a fluorosurfactant layer on the pixel electrodes, wherein a first portion of the UV light reactive fluorosurfactant layer is hydrophobic and a second portion of the UV light reactive fluorosurfactant layer is hydrophilic, and wherein the UV light reactive fluorosurfactant layer comprises a UV light reactive material and a fluorine based material, wherein exposing the first portions of the UV light reactive fluorosurfactant layer comprises phase separating the UV light reactive fluorosurfactant layer when the UV light reactive fluorosurfactant layer is exposed to the UV light such that the fluorine based material is positioned substantially above a cured layer of the UV light reactive material;

removing unexposed second portions of the UV light reactive fluorosurfactant layer; and forming partition walls in areas where the second portions of UV light reactive fluorosurfactant have been removed, wherein the areas are hydrophilic.

\* \* \* \* \*